Oct. 22, 1968  G. E. SORENSEN  3,406,459
METHOD AND MEANS FOR EVALUATING HOLE DIAMETERS
Filed Jan. 23, 1967  4 Sheets-Sheet 1
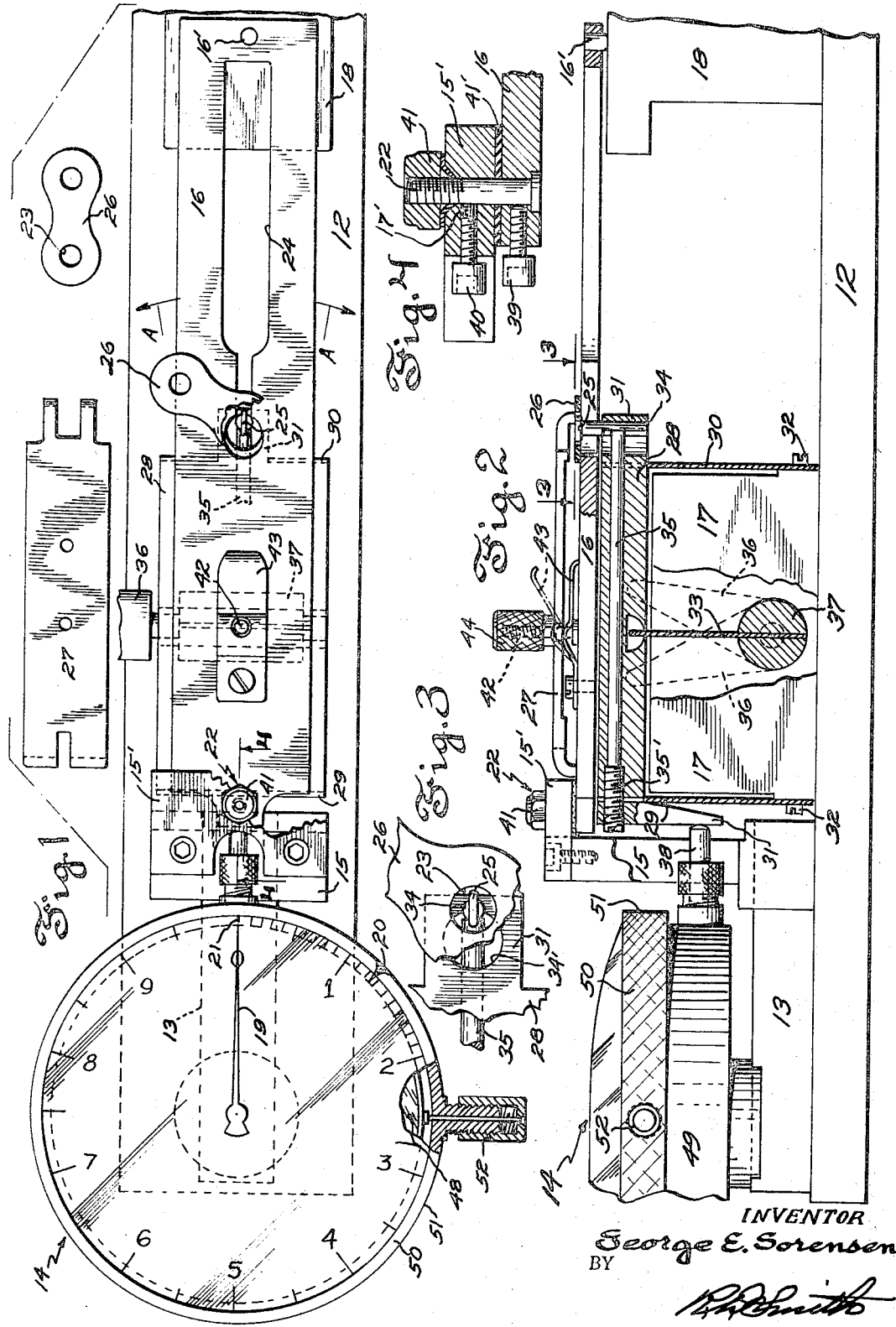
INVENTOR
George E. Sorensen
BY
ATTORNEY

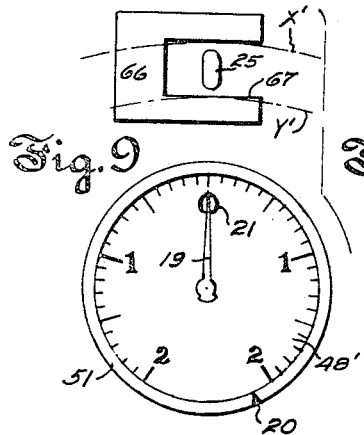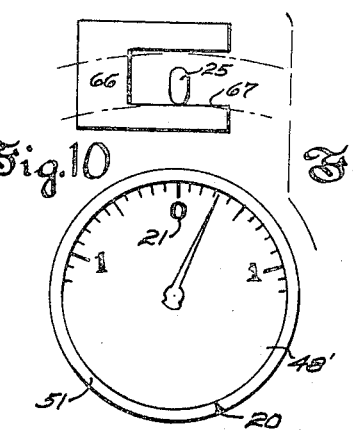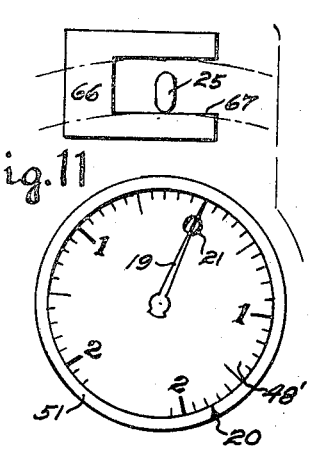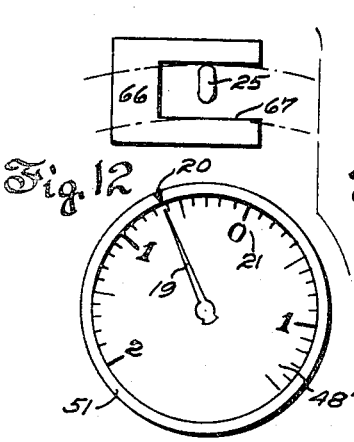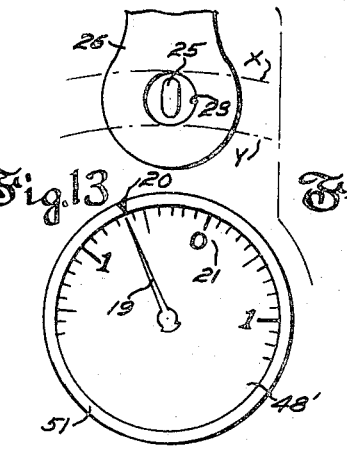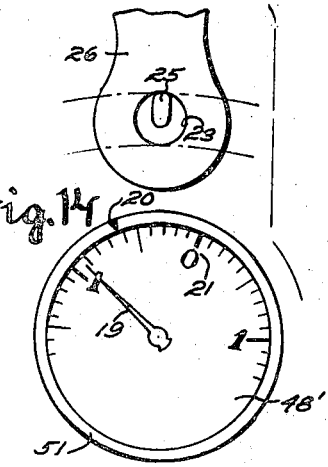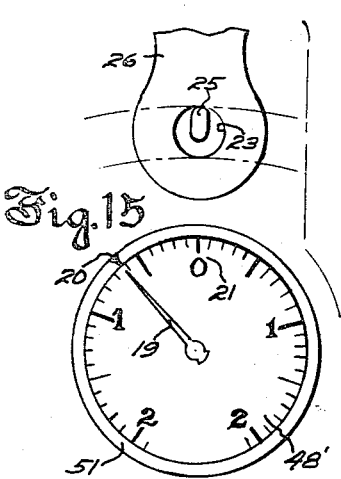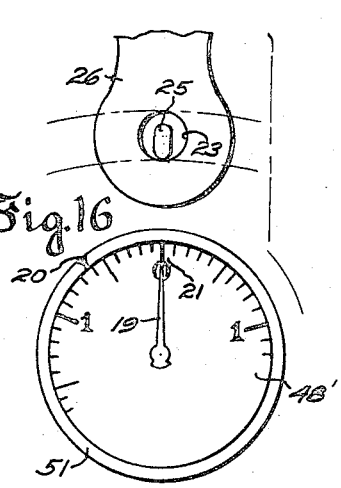

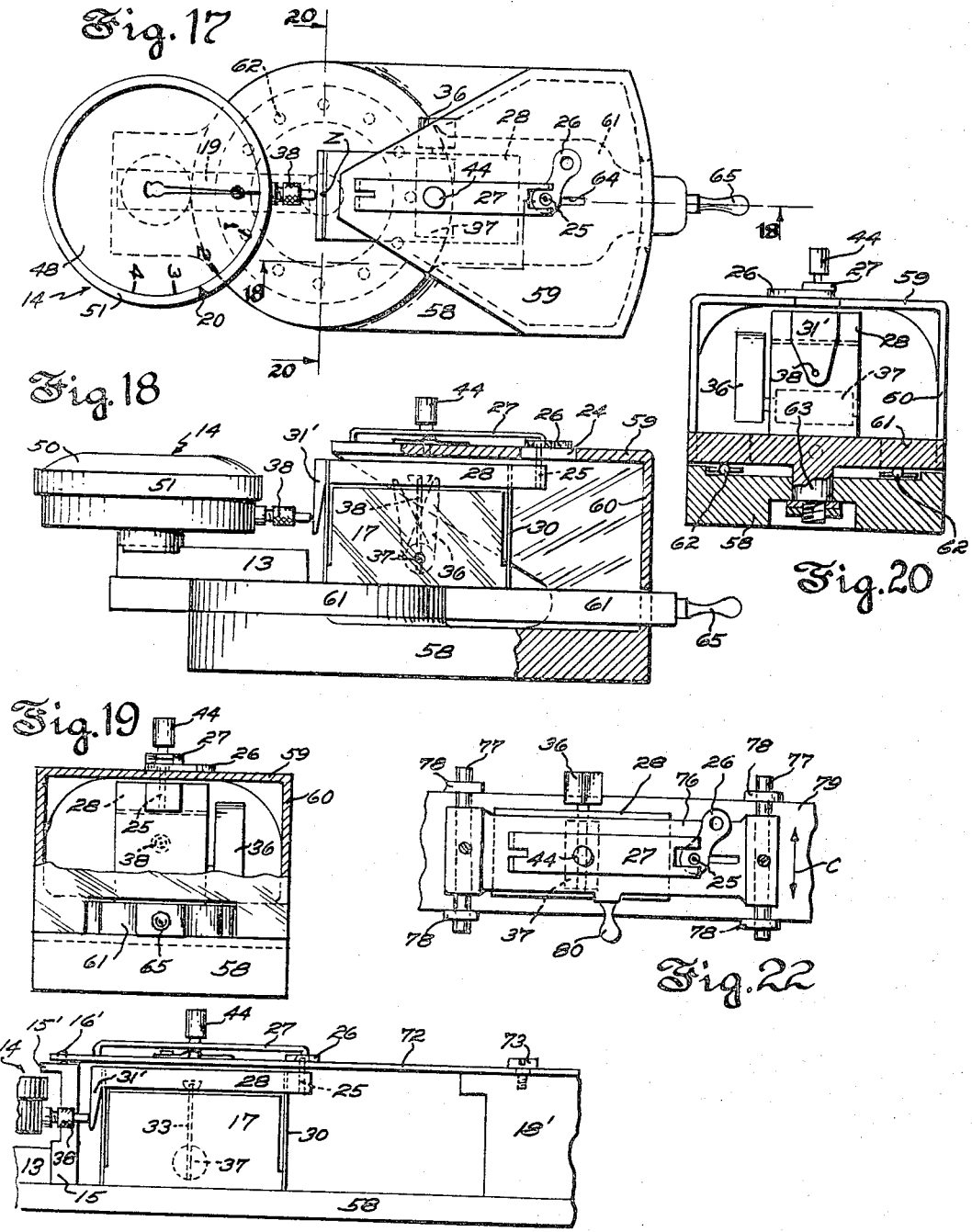

United States Patent Office 3,406,459
Patented Oct. 22, 1968

3,406,459
METHOD AND MEANS FOR EVALUATING
HOLE DIAMETERS
George E. Sorensen, 217 Chipman Drive,
Cheshire, Conn. 06410
Filed Jan. 23, 1967, Ser. No. 611,016
10 Claims. (Cl. 33—178)

ABSTRACT OF THE DISCLOSURE

Method and instrument for measuring and/or comparing with a standard dimension the diameter of a round hole in a workpiece by shifting a probe in a plane of movement coincident with the hole diameter sequentially from one and then to the other of opposite borders of the hole combined with testing for true coincidence of the hole diameter with such plane of probe movement.

Brief summary of the invention

This invention relates to ways and means for measuring or testing for accuracy the diameter of a substantially round hole in a workpiece without inserting plug gauges of oversize or undersize fit, and without spanning the hole with calipers or the like having spreadable, work contacting terminals.

One object of the invention is to provide an improved method for measuring, and/or testing for accuracy, the diameter of single holes in the same workpiece or different workpieces where such holes are too small to admit thereinto spreadable calipering legs that can simultaneously contact diametrically opposite borders of the hole.

A feature of the invention is, in the process of measuring a hole by shifting movement of a single probe, to associate operatively with the probe a scale of graduations marked by an indicator that is automatically moved along said scale to extents proportional to the shifting movement of the probe in its said uniplanar course. For ascertaining the diametrical dimension of a hole such scale can be marked at one point denoted by said graduations to represent the breadth of the probe and read at another point that is denoted by said graduations as the sum of the breadth of the probe plus the extent of movement of the probe in its uniplanar path.

Another feature of the invention is, in the process of testing or comparing a hole size with a standard dimension by the use of such probe, to first precondition the instrument in accordance with such standard dimension and then sequentially sense opposite borders of the hole to be tested by moving a single probe as aforesaid.

Still another feature is, in the process of comparing a hole size with a standard, to provide the aforesaid instrument with a scale of over-and-under graduations swept by the aforesaid indicator so as to read directly on the scale the dimension by which the size of the hole departs from the aforesaid standard dimension, and whether the error so read is a measure of oversize or undersize.

These and other objects of the invention will become apparent in greater detail from the following description of steps performed in practicing the method and structural features of an improved apparatus that is helpful in practicing the method, the description having reference to the accompanying drawings wherein:

FIG. 1 is an exploded plan view of a measuring instrument workpiece, and clamp for holding the workpiece, comprising apparatus embodying the invention and adapted to assist in carrying out the measuring method in which the invention resides.

FIG. 2 is a side view of the instrument with certain parts shown broken away or in central vertical section.

FIG. 3 is an enlarged fragmentary view of the work sensing probe occupying a hole in the workpiece as viewed from the plane 3—3 in FIG. 2, the swingable work carrier being omitted.

FIG. 4 is an enlarged view taken in section on the plane 4—4 through the pivot of the work carrier looking in the direction of the arrows.

FIG. 9 shows in schematic style a modfied dial indicator in which, for the measuring dial 48 of FIG. 5, there is substituted an error exhibiting dial on which the graduations read as increased dimensional values in both directions from zero along the scale.

Figure 6:
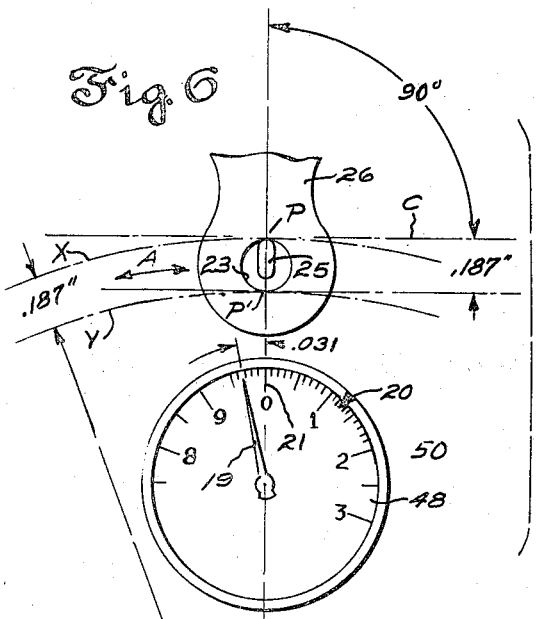
FIG. 6 shows the indicating pointer swung retrogressively along the scale of dial graduations as a way of marking on the dial a point according with a first, work sensing position to which the probe is moved.
Figure 7:
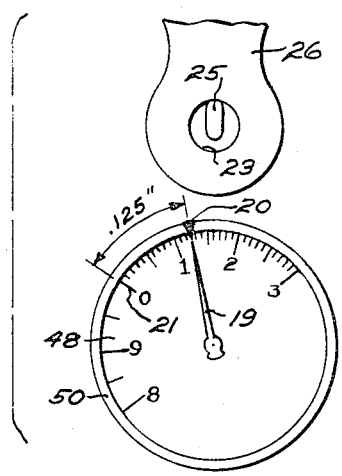
FIG. 7 shows the dial and marker index manually shifted in unison to a position that places the index in register with the indicating pointer while the probe remains stationary.
Figure 8:
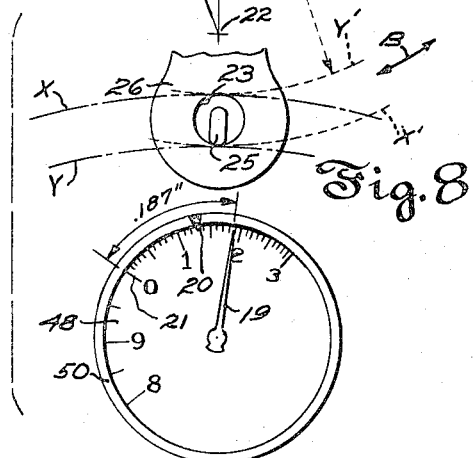
FIG. 8 shows the position to which the indicator pointer is next moved progressively along the scale so as to space off the distance traversed by the probe in moving to the diametrically opposite border of the hole to be measured.

FIGS. 10 to 12, in the manner of FIGS. 6 to 8, respectively show successive movements of the probe of the instrument of FIGS. 1 to 4 for sensing a gap in a master gauge in a manner to precondition the instrument for registering the dimensional extent of error by which a hole in a workpiece fails to accord with a target dimension of standard accuracy.

FIG. 13 shows a workpiece substituted for the master gauge of FIGS. 9 to 12 while the dial, the pointer, and the index marker of the indicator remain unchanged from their positions in FIG. 12.

FIGS. 14 to 16, inclusive, show work sensing movements of the probe comparable to those in FIGS. 6 to 8, respectively, for comparing the size of the hole in a workpiece with the width of the aforesaid gap in the master gauge.

FIGS. 17, 18 and 19 are respectively top, side and right end views of a modified form of measuring instrument embodying the invention wherein the workpiece is held stationary while the probe is movable in two crosswise related directions for sensing the workpiece and/or master gauge.

FIG. 20 is a view taken in section on the plane 20—20 in FIG. 17, looking in the direction of the arrows.

FIG. 21 shows a modified construction of the instrument of FIGS. 1 to 4 wherein the relative transverse movement between workpiece and probe takes place in an arc of opposite curvature from that in FIGS. 9 to 18, as shown in FIG. 8.

FIG. 22 shows a still further modified structure wherein the relatively transverse sensing movement between workpiece and probe takes place in a straight line.

A base for the instrument is designated 12 in FIGS. 1 and 2. Fixed on base 12 as a part thereof is a rail 13 supporting a dial indicator 14 in alignment lengthwise of the base with; first a post 15 having an overhanging head 15' from which is suspended the left end of a work carrier 16 which is swingable about a pivot pin 22 stationed in the posthead 15', secondly a housing 17 containing motion transmitting parts of the instrument, and thirdly a table block 18. Pivot pin 22 is shown in FIG. 4 to be a threaded stud having a headed bottom end supporting carrier 16 to which latter the shank of pin 22 is fixed by a set screw 39. Another set screw 40 serves to back up a slidable plug 17' which takes up and eliminates play in the rotary fit of pivot pin 22 within the hole in which it is journaled in posthead 15'. The top threaded end of pin 22 is retained by a nut 41 whose setting determines the frictional resistance offered to turning of carrier 16 relatively to posthead 15' by a spacer washer 41' lightly squeezed between said carrier and posthead. Nylon is a suitable material for both washer 41' and plug 16'.

The work carrier 16 is a thinnish rigid bar having a cutout 24 of keyhole shape shown in FIG. 1. Upward through the cutout there projects a probe or single sensing finger 25 into position within a round hole 23 in a workpiece 26 when the latter is removably clamped on the top surface of carrier 16. A holding strap 27 is releasably pressed down against the workpiece by thumbnut 44 on the carrier supported spindle 42 against the resilient lifting tendency of leaf spring 43. Strap 27 has bifurcate ends.

Beneath work carrier 16, and free for horizontal movement relatively thereto lengthwise of the instrument, floating slab 28 is borne above and clear of housing 17. The left end of slab 28 as shown in FIG. 1 is supported by an upstanding leaf spring 29 fastened fixedly thereto while its right end is supported by a corresponding leaf spring 30. The bottom ends of springs 29 and 39 are fixedly secured to the left and right external surfaces respectively of housing 17. Thus the horizontal movement of slab 28 carries with it the probe 25 in a uniplanar course lengthwise of the instrument. The axis of pivot 22 lies in the same plane. Being free to flex simultaneously, the springs 29 and 30 not only support slab 28 but yieldingly and resiliently oppose the aforesaid horizontal movement thereof in both directions. The probe 25 is carried detachably on the rear end of a lug-like extension of slab 28 which projects through a notch in the top margin of spring 30. The probe is fixedly lodged in a groove 34 in lug 31 formed at the side of a clearance hole 34' therein and is removably held therein by a set rod 35 that slides through the length of slab 28 and is urged against the side of the probe by a press screw 35'.

Means for manually urging the slab 28 toward the left or right in FIG. 1 comprise a manually swingable handle 36 whose rocker shaft 37 is pivotally supported in the housing 17. The throw of handle 36 is transmitted to the slab by any suitable resilient and yielding means which may comprise a third upstanding leaf spring 33 fixed on shaft 36' to function as disclosed in FIG. 8 of applicant's U.S. Patent No. 2,774,145. The stiffness of spring 33 is sufficient to overcome the resistance of springs 29 and 30. When the slab 28 is forced toward the left by handle 36 for urging probe 25 into yielding contact with workpiece 26 the springs 29 and 30 which support the slab will likewise be flexed to the left toward the dial indicator 14. A rigid lug 31' fixedly depending from the left end of the slab 28 then exerts a thrust toward the left against the sensing plunger 38 of the indicator which causes rotary measuring movement of the indicator pointer 19. The thrust receiving terminal 38' of plunger 38 is adjustable as shown in FIGS. 14 and 15 of said patent for calibrating the instrument with respect to the rotary position of indicator 14 corresponding to different positions of probe 25. Mechanism within the indicator that is suitable for this purpose is disclosed in substance in FIG. 8 of the applicant's aforesaid patent. Certain stops therein are herein shown eliminated because they are not needed for the purpose of this invention.

The dial 48 of indicator 14 carrying a scale of graduations progressing from the zero graduation 21 is rotatably adjustable on the indicator casing 49, sometimes in unison with the bezel 50, by means of the knurled rim 51 of the latter when a set screw 52 in the bezel is tightened so as to clutch the peripheral edge of the dial. A practical construction for so doing is disclosed in applicant's U.S. Patent No. 2,774,145 with particular reference to FIGS. 15 and 19 of the drawings thereof. When set screw 52 is loosened, the bezel alone can be rotatably adjusted and the dial will be held stationary by means of frictional cling to the casing 49. The index marker 20 is fixed on and travels only with the bezel so as to be set into register selectively with different dial graduations. The measurement indicating pointer 19 is constantly subject to the returning urge of a spring such as that designated (92) in the aforesaid patent and this keeps the sensing plunger 38 of the indicator constantly in thrusting contact with the lug 31' on the left end of the floating slab 28.

An example of practical use of the instrument for measuring and indicating the dimensional size of a hole, as distinguished from its use for comparing a hole size with a standard dimension, will first be described. The workpiece 26, containing the hole 23 that is to be measured, is first clamped on the swingable carrier 16 by holding strap 27 in such arbitrary position that the probe is movable in a uniplanar path crosswise the hole. The breadth of the probe will be spaced off from the zero graduation 21 on the dial 48 of the indicator 14 by turning the bezel 50 relatively to the dial to a point indicated by the scale of graduations as the known breadth of the probe 25 in its uniplanar path of movement. At this point the clutch screw 52 on the bezel will be tightened against the edge of the dial as shown in FIG. 15 of the aforesaid patent and the spacing of the index marker 20 from zero on the dial thus becomes fixed and will remain so throughout a measuring operation.

Figure 5:
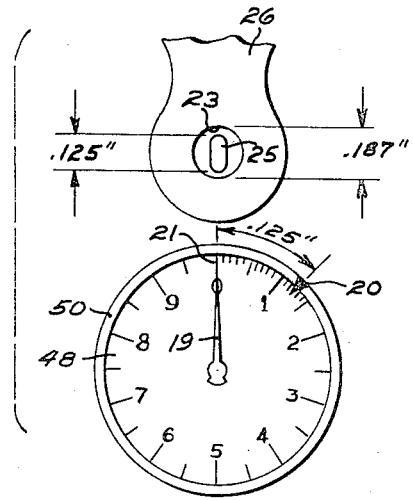
FIG. 5 is a diagram representing parts cooperatively positioned as in FIG. 1.

As shown in FIGS. 3 and 5 the initial positioning of a hole 23 that is .1875" in diameter in a workpiece 26 in relation to a probe 25 that is .125" broad may be arbitrary but here will be assumed to be such that the probe touches neither of the opposite borders of the hole. Bearing in mind that the workpiece 26 has been clamped on the carrier 16 in fixed relation thereto but that the carrier itself is free to be oscillated about the stationary axis of its pivot 22, as indicated by arrows A in FIG. 1, it is seen that the workpiece hole can be swung in a circular path having the axis of pivot 22 as its center of curvature. Such path is represented by the arcuate lines X and Y in FIG. 6. Arc X falls tangent to the circular border of the workpiece hole that is most distant from pivot 22, and arc Y falls tangent to the circular border of the hole that is nearest pivot 22.

With the workpiece thus movable in an arcuate path transversely of the uniplanar path of movement of probe 25, the second step in the operation is to shift the probe in its uniplanar path whatever distance, such as .0312", may be required to bring the probe into sensing contact with the border of the hole farthest from pivot 22, thus to arrive at the point of tangency thereto of the arc X and causing the measuring pointer 19 to assume some arbitrary position such as that shown in FIG. 6. This can be done very accurately by observing pointer 19 as the workpiece 26 on its carrier 16 is swung from side to side to small extents while simultaneously the probe is urged into light pressure contact with the said border of the hole. When the said point of tangency is reached by the probe this can be known exactly because then any swinging of the work carrier 16 in either direction will be seen to displace pointer 19 from its aforesaid arbitrary position shown in FIG. 6. It is to be noted that a true diameter of the hole now stands aligned exactly with the plane of movement to which the probe is restricted and that for this sensing step of the method the hole to be measured is moved relatively to a single probe in contrast to the familiar measuring practice of spreading the probing legs of internal calipers into simultaneous sensing relation to diametrically opposite borders of the hole to be measured. Meanwhile the instrument dial with its zero graduation 21 and the bezel carried index marker 20 will have remained stationed in their original positions shown in FIGS. 1 and 5.

The next, or fourth step is to rotatively adjust the indicator dial 48 with its zero graduation 21 in unison with index marker 20 counterclockwise until the latter registers with the indicator pointer wherever the pointer may be found to be stationed as a result of the aforesaid first sensing step of the method. The work carrier 16 will remain stationed against accidental or unwanted swinging about pivot 22 by means of the frictional resistance offered by washer 41'.

The next, or fifth step in the operation is performed while the indicator dial 48 and the index marker 20 remain stationary in their relatively fixed new absolute positions shown in FIG. 6. The probe 25 will now be shifted toward the left in FIGS. 1 and 2 (downward in FIG. 8) into contact with the diametrically opposite border of the hole at its point P' of tangency to the arc Y. This is done by throwing the probe actuating handle 36 in the opposite direction or counterclockwise in FIG. 2. This second shifting movement of the probe takes place along a true diameter of the hole for reasons aforesaid.

The above described fifth step in the method will cause the indicator pointer 19 to swing clockwise about the dial an amount .062" corresponding to the entire dimensional difference between the unknown diameter of the hole and the known breadth of the probe. Thus pointer 19 will be brought to a point on the dial indicated by the scale graduations to be a dimension .125" that is the sum of the breadth of the probe and the difference between the hole diameter and said breadth, in other words the true diameter of the hole.

For further assurance against error there may be employed a second step of causing relative movement between probe 25 and the workpiece, this time along arc Y of FIG. 8 transverse the uniplanar path of movement of the probe while the probe is urged into light pressure contact with the opposite border of the hole at the point P'. As before, it can be known when the point of contact of the probe with the border of the hole coincides with the point P' of tangency of arc Y because then any swinging of work carrier 15 in either direction will be seen to displace pointer 19 counter clockwise from its position shown in FIG. 8.

By geometry, if in FIG. 6 the point of tangency P of the arc X with the hole circumference coincides with the point of sensing contact of the probe 25 therewith, it follows that point P lies in the plane of movement M of the probe and also that the point of tangency P' of the arc Y with the hole circumference occupies the same plane, wherefor a full diameter of the hole 23 extending from P to P' coincides with such plane. This would appear to make unnecessary the above mentioned repetition of testing for the point of tangency of the hole circumference, this time at P' with arc Y instead of arc X, but in extremely accurate work a more reliably exact measurement of the hole diameter might result by detecting and compensating for some small error in the initial sensing for the point of tangency P.

In this connection it may be pointed out that in my said earlier patents, Nos. 2,774,145 and 2,388,582, the centers of both of two workpiece holes, whose center spacing is to be evaluated by comparison with a standard dimension, can be brought into a common plane with the dimension sensing movement of one of two cooperative probes by the unrestricted freedom of the workpiece to slide on and relatively to its underlying support, whereas in the present improvements the workpiece is fixed to its underlying support 16 and there is provided relative sidewise movement between such support and the course of measuring travel of the probe for sensing the size of the hole.

In using the instrument of FIGS. 1 to 5, inclusive to compare the size of the hole 23 in the workpiece with a standard dimension, so that the indicator 14 will read as the extent of erroneous departure, if any, of the hole size from such standard dimension, a master gauge 66 containing a gap of exactly the standard width may be used to precondition or calibrate the instrument as follows.

FIGS. 9 to 12, inclusive, show the steps of a method that can be employed for so preconditioning the instrument, after which the preconditioned instrument can be used to sense the borders of the hole 23 in the workpiece 26 in the manner previously described.

For the purpose of obtaining a direct reading of the actual dimension of error, there will first be secured to the work carrier 16 of the instrument, as by use of the aforesaid clamp 27, a master gauge 66 containing a gap 67 of an exact standard width with which the diameter of the hole 26 in the workpiece is to be compared. A modified dial 48' will be used that carries an over-and-under scale of graduations progressing in dimensional values in each of opposite directions from the zero graduation 21'.

Gauge 66 will be placed on carrier 16 in such position that the probe 25 can reciprocate from side to side of the gap 67 without initially contacting the gauge at either side of the gap. At this time the zero graduation 21' on dial 48' may be arbitrarily positioned, but it is shown at top center position in FIG. 9. By swinging the handle 36 toward the left in FIG. 1 the probe will be brought into sensing contact with the first side of the gap 67 nearest the indicator 14. If the pointer 19 as in FIG. 9 happens initially to register with the zero graduation 21' such movement of the probe will displace the pointer clockwise into register, say, with the "plus" graduation .031 as shown in FIG. 10. It can be known when the plane of travel of the probe 25 falls perpendicular to the parallel sides of the gap 67 because then any swinging of the gauge either clockwise or counterclockwise from the position shown in FIG. 10 in the arcaute paths X' and Y' will cause pointer 19 to swing counterclockwise.

While pointer 19 remains stationed as in FIG. 10, dial 48 will then be turned so that zero graduation 21' registers with the pointer as in FIG. 11.

Probe 25 will then be shifted in its aforesaid plane of travel into contact with the gauge at the second side of the gap farthest from the indicator 14. This movement of the probe will cause pointer 21 to swing counterclockwise into register with the "minus" graduation .062. The fact that such plane is perpendicular to the sides of the gap 67 in the gauge 66 can be tested by again swinging the gauge crosswise said plane as aforesaid in FIG. 10.

Index marker 20, which in the meantime has remained stationary in some arbitrary position, will now be adjusted to register with the pointer at the "minus" .062 graduation on the dial, and by means of the set screw 52 the bezel 50 carrying the index marker 20 will be locked to the dial 48 as in FIGS. 12 and 13.

These preconditioning or calibrating steps of the comparing method have left the zero graduation 21' displaced from alignment with the plane of travel of the probe to an extent which may be arbitrary as to absolute position and which will depend on the variable initial position of the probe relative to the sides of the gap in FIG. 9.

Now when the gauge 66 is removed from carrier 16 and replaced by a workpiece 26, that is to be tested as to the size of the hole 23 as shown in FIG. 13, the same procedure will be used as in the description of FIGS. 5–8 inclusive, while the zero graduation 21 and the index marker 20 remain stationary in their positions established in FIG. 12. As an example the probe 25 can first be moved into sensing contact with the second side of the hole farthest from the indicator 14'. This will swing pointer 21 counterclockwise to its position shown in FIG. 14.

Next, and while the probe 25 remains stationary, the index marker 20 will be turned into register with the pointer 19 as shown in FIG. 15, the zero graduation 21' having moved into unison therewith because dial 48' and bezel 50 remain locked together.

Now when probe 25 is shifted to the first side of the hole in the workpiece the pointer will be swung into exact register with the zero graduation if the hole 23 is exactly the same size as the gap in gauge 66 by which the instrument was preconditioned or calibrated. If the work hole is smaller than the standard gap in the gauge, the pointer 19 will register with some graduation on the "minus" side of zero. If the work hole is larger than the standard dimension, pointer 19 will register some graduation on the "plus" side of zero. In either case there is readable on the dial 48' the actual error, denoted as plus or minus, by which the work hole fails to accord with the master dimension. This becomes known, without computation, by mere observation of the pointer 19 and the scale of graduations.

FIGS. 17 to 20 illustrate an instrument of modified construction embodying the invention and which can be used to assist in practicing the improved method. In FIG. 17 the instrument has a base 58 comparable to base 12 in FIGS. 1 and 2. Base 58 is extended to include a partial box-like superstructure 60 whose top wall 59 serves to support the workpiece 26 secured fixedly thereon by the holding strap 27. Strap 27 is releasably retained as in FIG. 3 by thumb nut 44 having threaded engagement with spindle 42 which fixedly upstands from the top wall 59 of the superstructure. It is therefore seen that the work support is stationary with the base 58 instead of movable relatively thereto.

In FIGS. 17 to 20 the housing 17 is carried on a movable platform 61 that is mounted to be oscillated to small angular extent about the pivotal axis designated Z in FIG. 17. A mid-portion of platform 61 is circular with a depending trunnion 63 journaled in the base and rests on a ring of bearing balls 62 retained within a depressed area in the top surface of base 58. Platform 61 carries the dial indicator 14 in fixed relation to housing 17 and the sensing plunger 38 is acted upon by lug 31' as in FIG. 2 when the floating slab 28 shifts toward the left. A clearance aperture 64 in the work supporting wall 59 permits the probe 25 to extend upward therethrough into sensing relation to the hole 23 in the workpiece that is to be measured, or tested by comparison with a standard dimension to which the instrument is calibrated.

In operating the instrument of FIGS. 17 to 20, the probe 25 is shifted by means of actuating handle 36, in a course of work sensing movement confined to a vertical plane, which plane is not in fixed relation to the base as in FIG. 1 but sways about the axis Z as the platform 61 is swung about such axis by means of the handle 65. In this manner the probe is made to sense the workpiece by movement relatively thereto in a path transverse the movement of the probe in a course confined to the vertical plane aforesaid. Since the workpiece remains stationary on a very sturdy type of support in FIGS. 17 to 20, much larger and heavier workpieces can be measured or tested by this type of instrument construction, the ball bearing support for table 61 providing the sensitivity needed in extremely accurate performance.

FIG. 21 illustrates a modification of the instrument of FIG. 1 in which the relative movement between workpiece and probe takes place in an arc of curvature B that is opposite to the direction of curvature A in FIGS. 1 to 6. This is accomplished by pivoting the work support bar 72 at 73 on the supporting block 18' and letting its opposite end slide on the top of post 74 fixed on base 12.

The further modified construction of instrument shown in FIG. 22 provides easily manipulated means for simultaneously producing relative movement of workpiece and probe in each of two relatively crosswire directions both of which are rectilinear, one direction being that designated C in FIG. 6. For this purpose the work support 76 carries cross rods 77 slidable lengthwise in bearing brackets 78 upstanding rigidly from the edges of base 79 and is equipped with an actuating handle 80. This results in the ability to reciprocate the work support 76 in the straight path designated C in FIG. 6 simultaneously with the usual workpiece contacting movements of the probe 25 in its uniplanar course in a vertical plane to which the path C is approximately perpendicular.

What is claimed is:

1. The method of evaluating the diametrical dimension of a substantially round hole in a workpiece by sequentially sensing diametrically opposite borders of the hole, which comprises the steps of, yieldingly urging a probe in a uniplanar course toward and against the concavely curved border of the hole at a first point of sensing contact therewith, simultaneously producing relative movement between said workpiece and said probe in a direction transverse said course whereby to ascertain when said point of sensing contact lies within a diameter of said hole that coincides with said course, marking on a scale of dimensional graduations of a dial gauge responsive to the position of said probe along said course a starting position from which to space off a distance proportional to subsequent movement of said probe along said course, yieldingly urging said probe to move in a reverse direction along said course toward and against said border of the hole at a second point of sensing contact therewith diametrically opposite said first point of sensing contact, and spacing off from said starting position on said scale a distance indicated by said graduations to be proportional to the movement of said probe in said reverse direction whereby to evaluate the diametrical dimension of the hole.

2. The method defined in claim 1, in which the said step of spacing off is preceded by again producing relative movement between the said workpiece and the said probe in a direction transverse the said course while said probe is yieldingly urged against the border of said hole at the said second point of sensing contact therewith, whereby to ascertain that said second point of contact lies accurately on said diameter of the hole.

3. The method defined in claim 1, in which the said starting position from which to space off the said distance is indicated by the said graduations to be the breadth of the said probe along the said uniplanar course of movement thereof, whereby the said step of spacing off arrives at a position on said scale directly readable by means of said graduations as the said diameter of the hole.

4. The method defined in claim 1, in which the said scale includes a dimensional graduation denoted as zero, and the said starting position on the scale is displaced from said zero graduation an extent according with the correct dimension of the hole diameter to be evaluated, whereby if the said step of spacing off from said starting position arrives at a graduation displaced from zero the dimensional extent of such displacement is directly readable by means of said graduations as the error by which the actual diameter of the hole fails to accord with said correct dimension.

5. An instrument for measuring and/or testing the diametrical dimension of a single round hole in a workpiece by sequentially sensing with a probe of fixed compass points in the border of the hole determined to be diametrically opposite by maneuvering the instrument, comprising in combination, an instrument frame, a first support reciprocative on said frame in a predetermined path of movement, means to mount in fixed relation to said first support a workpiece containing a round hole whose diameter is to be evaluated, a second support reciprocative on said frame in a different path of movement crosswise said predetermined path, a probe of smaller compass than the diameter of said hole fixedly mounted on said second support in position to be carried thereby in a rectilinear course from side to side of said hole, a scale of graduations stationed on said frame denominated as progressive extents of movement of said probe in said course, an indicator mounted on said frame to move along said scale into register with said graduations, and connections transmitting movements of said second support to said indicator in a manner to cause the latter to register with graduations on said scale informative of the dimension of the diameter of the hole.

6. An instrument as defined in claim 5, in which the said instrument frame includes a pivot about which the said first support is swingable relatively to the other of said supports in a circular path described from said pivotal axis.

7. An instrument as defined in claim 6, in which the said pivotal axis intersects the plane of the said course of probe movement.

8. An instrument as defined in claim 5, in which the first said support comprises a relatively thin slab carrying the said workpiece fixedly on the top surface thereof, and the said second support is located below said slab, said slab carrying said workpiece in a manner to expose the said hole therein to dimension sensing occupancy by the said probe.

9. An instrument as defined in claim 8, in which the said slab has an aperture through which the said probe extends into occupancy of the said hole.

10. An instrument as defined in claim 5, together with separate handles connected to move each of the said supports independently of the other for determining that the center of the said hole lies in the said rectilinear course of movement of the said probe.

References Cited

UNITED STATES PATENTS

| 889,853 | 6/1908 | Levy | 33—172 |
| 1,530,067 | 3/1925 | Young | 33—172 |
| 1,671,220 | 5/1928 | Bartholdy | 33—172 |
| 1,994,497 | 3/1935 | Winters | 33—172 |
| 2,659,158 | 11/1953 | Cobb | 33—179.5 |

SAMUEL S. MATTHEWS, *Primary Examiner.*